Dec. 10, 1968 W. G. HOOVER ET AL 3,416,033
TENSION LINK FOR USE WITH ELECTROSTATICALLY CHARGED OBJECTS
Filed April 22, 1966 2 Sheets-Sheet 1
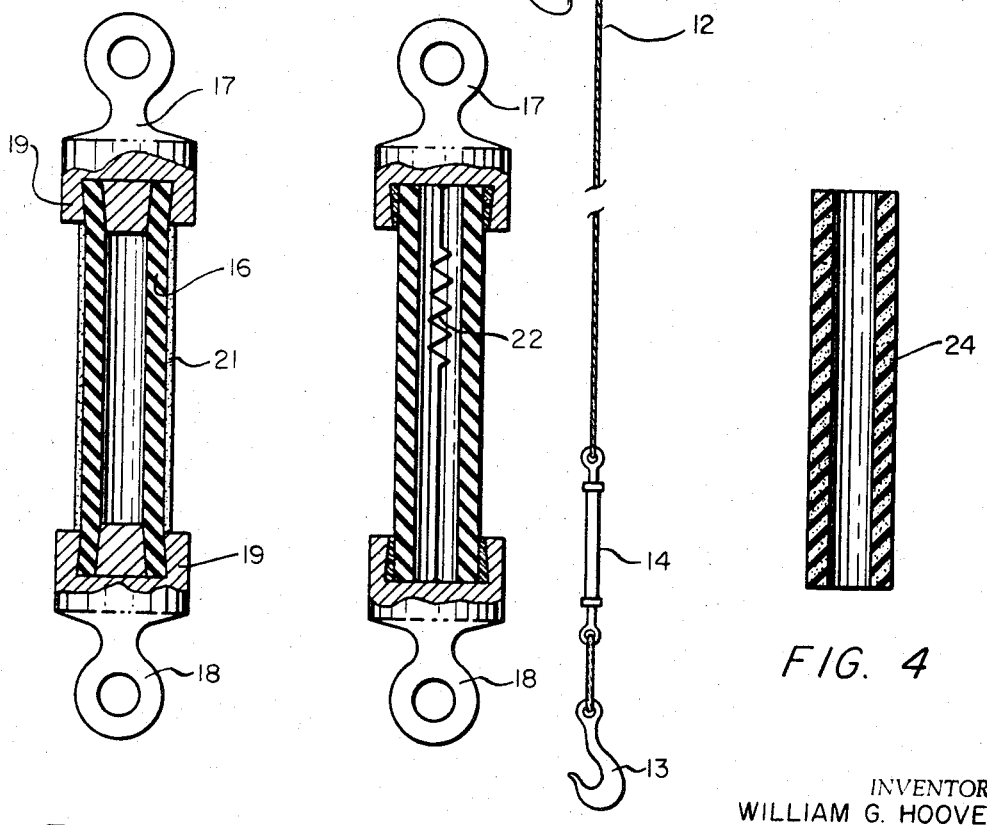
INVENTORS
WILLIAM G. HOOVER
KENDRIC A. MOORE
BY
Fletcher and Swain
ATTORNEYS

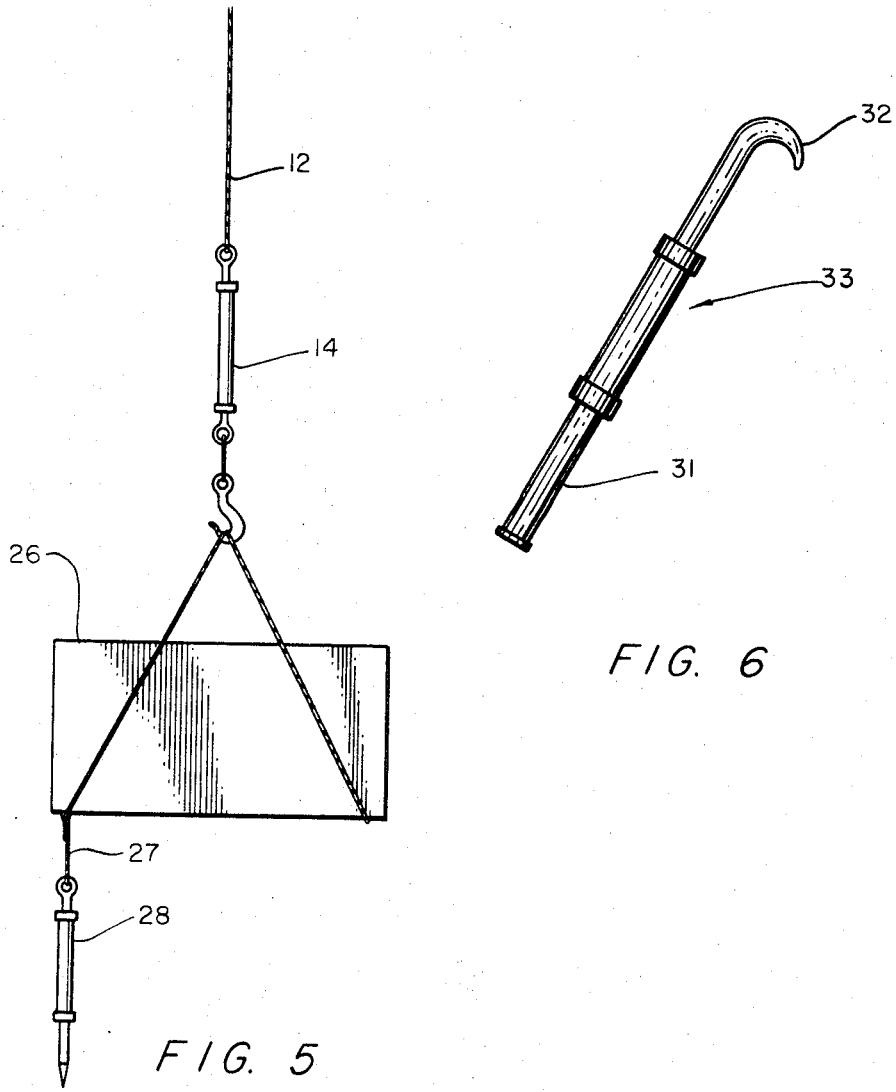

United States Patent Office 3,416,033
Patented Dec. 10, 1968

3,416,033
TENSION LINK FOR USE WITH ELECTRO-
STATICALLY CHARGED OBJECTS
William G. Hoover, Los Altos Hills, and Kendric A.
Moore, Millbrae, Calif., assignors to Granger Associates, Palo Alto, Calif., a corporation of California
Filed Apr. 22, 1966, Ser. No. 544,554
4 Claims. (Cl. 317—2)

ABSTRACT OF THE DISCLOSURE

A tension link for connection in series with aircraft hoist cables to provide a series electrical resistance for dissipating electrical charge from the aircraft to thereby minimize damage or injury to equipment or personnel associated with the cable.

This invention relates generally to a tension link for use with electrostatically charged objects and more particularly to a resistive tension link for use with aircraft hoisting cables.

Aircrafts are electrostatically charged by tribo electric effects. Depending upon the size of the aircraft and its proximity to earth, the electrostatic charge may have energies as high as 20 watts seconds or more. When a hovering aircraft, such as helicopters or vertical take-off aircraft, are used in hoisting operations, the hoist cable provides a conductive path. When the ground circuit is completed through the cable, the electrostatic energy is discharged. Generally, the cable is grasped by ground personnel for connection to an associated load, and thus the energy discharges through the body. This may cause injury to the body, or the reaction to the shock may cause an accident such as a fall. In certain applications, electrical discharging or sparking causes dangerous conditions in that explosives and/or explosive mixtures may be involved with the associated environment.

When the aircraft is employed to transport loads having high electrical capacity, the load itself may achieve a high electrostatic charge.

It is a general object of the present invention to provide a resistive tension link for use with electrostatically charged objects.

It is another object of the present invention to provide a resistive tension link for use with aircraft hoist cables for control of the discharge rate.

It is another object of the present invention to provide an aircraft tension link which minimizes the possibility of arcing or sparks.

It is still a further object of the present invention to provide an aircraft tension link which presents a resistance which is substantially higher than that of the human body whereby the energy is slowly discharged and substantially dissipated in the resistive means.

It is still a further object of the present invention to provide an aircraft tension link which is capable of supporting loads associated therewith while still offering a relatively high resistance path for the slow discharge of energy.

It is still a further object to provide a tension link making possible the safe handling of loads.

The foregoing and other objects of the invention will become more clearly apparent from the following description when taken in conjunction with the accompanying drawing.

Referring to the drawing:

FIGURE 1 schematically shows a helicopter including a hoist cable incorporating a tension link in accordance with the invention;

FIGURE 2 is an enlarged view of one embodiment of a tension link;

FIGURE 3 is an enlarged view of another embodiment of a tension link;

FIGURE 4 shows a resistive tension means for use in a tension link of the type described;

FIGURE 5 shows a load hoisted by a hoist cable including a tension link and tag line including a tension link depending therefrom; and FIGURE 6 shows a hook including a tension link.

In FIGURE 1, there is shown a helicopter 11. It is well known that the rotation of the blades will cause tribo electric charging of the helicopter. The helicopter may also be charged by dust, snow, rain, etc.; by the exhaust gases and by its position in the normal electric field between the earth and the ionosphere. The amount of charge will depend on the size of the aircraft and its proximity to ground, the energy increasing with the size of the aircraft and its proximity to ground. A hoist cable 12 having a hook 13 is suspended from the helicopter. When ground personnel grasp the hook 13 and attach it to a load to be hoisted, they complete a conductive path to ground. This discharges the aircraft through the body. Such discharge might cause injury or death from the electrical shock. Even if the discharge of energy does not cause direct injury, the shock might cause a person to lose his footing and fall, or the person's sudden reaction might cause him to strike adjacent objects. In an explosive environment, any spark would cause an explosion.

In accordance with the present invention, there is provided a resistive tension link 14 connected in series with the cable 12. In the example shown, the link 14 is connected between two portions of cable 12 with the lower portion, in turn, being connected to the clamp 13. It is, of course, apparent that the tension link may be disposed anywhere in series with the cable whereby the energy flowing through the hoist cable flows therethrough.

Referring more specifically to FIGURE 2, a suitable tension link is shown. The tension link may comprise a solid or hollow cylindrical tension member 16 which may, for example, be formed of relatively strong insulating material such as fiberglass. Conductive end caps 17 and 18 are secured to the ends of the member 16, for example, by a wedging action. The caps 17 and 18 are provided with a tapered recess 19 which receives the respective ends of the tension member 16. A tapered plug 20 serves to flare the ends outwardly. The surface of the recess may be lubricated. Tension applied to the members 17 and 18 causes the plug to wedge the member 16 against the recesses. The outer or inner surface (in the illustrative example, the outer surface) of the cylindrical tension member 16 is provided with a conductive layer or coating 21 which contacts the caps. The coating may be applied in such a manner that it extends over the lower portion of the caps to assure a good electrical connection. The coating may be formed by applying a resistive paint which comprises conductive particles suspended in a volatile solvent. When the solvent has evaporated, the particles provide a high resistance conductive path along the surface of the member. The resistance may be controlled by controlling the thickness of the layer and the extent of the surface covered. The resistive surface may be formed by placing the member 16 in a furnace and evaporating the conductive material thereon. In any event, there is provided in series between the connectors 17 and 18 a resistive path 21 through which the discharge currents flow.

It has been found that the voltages which build up in the aircraft are in the range of 1 to 200 kv. and that the energy to be dissipated may range from about $10^{-4}$ to 20 watt seconds, or more. As is well known, a human body has a resistance in the neighborhood of 20,000 ohms. By selecting the resistance of the tension link to be in the neighborhood of 1 to 1000 megohms, the rate of discharge through the body is reduced. The energy is dissipated almost entirely in the resistive path since it has a substantially higher resistance.

In FIGURE 3, there is shown an alternate embodiment of the tension link. The resistive path is provided by a lumped resistor 22 connected between the conductive end members 17 and 18. The wedging action is achieved by using a tapered collar 25 secured to the tension member and slidably received in the tapered recess 19 to provide the wedging action.

The series resistance may also be formed by suspending conductive particles in the supporting member. This is schematically illustrated in FIGURE 4.

Referring to FIGURE 5, there is shown a load 26 hoisted by a cable 12 including a tension link 14. Depending downwardly from the load is a conductive cable 27 including a tension link 28 which may be of the type previously described. Any electrostatic energy accumulated in the load can then be dissipated by grasping the line to ground the same. The tag line can also be used to position the load by pulling thereon.

The load may also be positioned and the energy discharged by means of a hook such as shown in FIGURE 6. The hook shown includes a handle 31, a hook 32 and a tension link 33 of the type described. Again, the energy is dissipated primarily in the tension link.

There is provided a series or tension link in the hoisting cable which can stand the tensile stresses encountered in a hoisting operation and yet which provides a relatively high resistive path to control the rate of discharge whereby shock, sparking and the like are minimized.

We claim:
1. For use with tension means associated with electrostatically charged objects, a tension link comprising a tension member made of insulating material, conductive means secured to the end of said tension member to connect said tension member with said tension means whereby said member is subjected to tensile stresses, and resistive means providing a resistive path between said conductive means to provide a resistance in series with said tension means.

2. A tension link as in claim 1 in which said resistive means comprises a layer of resistive material applied to the surface of said tension member and contacting the conductive means.

3. A tension link as in claim 1 in which said resistive means comprises resistive particles impregnated in said tension member.

4. In an aircraft hoist cable, a tension link comprising a tension member made of insulating material, conductive means secured to the ends of said tension member and adapted to be connected to hoist cable to connect the tension link with the cable whereby the tension link is subjected to the same tensions as the hoist cable, and resistive means connecting said conductive means secured to the ends of said tension member to provide a resistance in series with said cable.

References Cited

UNITED STATES PATENTS 1,940,491  12/1933  Freitag _____ 317—2 X

FOREIGN PATENTS 122,657  2/1919  England.

JOHN F. COUCH, *Primary Examiner.*

J. A. SILVERMAN, *Assistant Examiner.*